(12) United States Patent
Paulino et al.

(10) Patent No.: US 12,393,770 B2
(45) Date of Patent: Aug. 19, 2025

(54) EFFICIENT GENERATION OF REVIEW SUMMARIES

(71) Applicant: Microsoft Technology Licensing, LLC, Redmond, WA (US)

(72) Inventors: Edy Daniel Paulino, Bellevue, WA (US); Kyle Matthew Unger, Seattle, WA (US); Judah Gabriel Himango, Monroe, WA (US); Wey Hsuan Low, Seattle, WA (US)

(73) Assignee: Microsoft Technology Licensing, LLC

( * ) Notice: Subject to any disclaimer, the term of this patent is extended or adjusted under 35 U.S.C. 154(b) by 0 days.

(21) Appl. No.: 18/300,238

(22) Filed: Apr. 13, 2023

(65) Prior Publication Data

US 2024/0346233 A1   Oct. 17, 2024

(51) Int. Cl.
| | |
|---|---|
| G06F 40/166 | (2020.01) |
| G06F 16/34 | (2025.01) |
| G06F 40/40 | (2020.01) |
| G06N 3/08 | (2023.01) |
| G06N 20/00 | (2019.01) |

(52) U.S. Cl.
CPC .......... *G06F 40/166* (2020.01); *G06F 16/345* (2019.01); *G06F 40/40* (2020.01); *G06N 20/00* (2019.01); *G06N 3/08* (2013.01)

(58) Field of Classification Search
CPC .......... G06F 16/345; G06N 20/00; G06N 3/08
See application file for complete search history.

(56) References Cited

U.S. PATENT DOCUMENTS

| | | | |
|---|---|---|---|
| 10,002,371 B1* | 6/2018 | Baker | G06F 16/24578 |
| 11,769,017 B1* | 9/2023 | Gray | G06N 20/00 704/9 |
| 2014/0164302 A1* | 6/2014 | Di Fabbrizio | G06N 5/02 706/46 |
| 2019/0361987 A1* | 11/2019 | Qiao | G06F 16/345 |
| 2020/0020000 A1* | 1/2020 | Guy | G06Q 30/0282 |
| 2020/0285662 A1* | 9/2020 | Chatterjee | G06F 40/30 |
| 2021/0012405 A1* | 1/2021 | Wadhwa | G06Q 30/0631 |
| 2021/0012406 A1* | 1/2021 | Wadhwa | G06Q 30/0255 |
| 2021/0117617 A1* | 4/2021 | Blaya | G06F 40/253 |
| 2021/0406336 A1* | 12/2021 | Tripathy | G06F 16/9577 |
| 2023/0020886 A1* | 1/2023 | Mahapatra | G06N 3/08 |
| 2023/0071799 A1* | 3/2023 | Ramnani | G06N 20/00 |

* cited by examiner

*Primary Examiner* — Asher D Kells
(74) *Attorney, Agent, or Firm* — Shook, Hardy & Bacon L.L.P.

(57) ABSTRACT

Methods, computer systems, computer-storage media, and graphical user interfaces are provided for efficiently generating review summaries. In embodiments, reviews associated with an item are obtained. A set of the reviews are then determined or selected based on an attribute associated with the corresponding review. Thereafter, a model prompt to be input into a trained machine learning model is generated. The model prompt can include an indication of the item and the determined set of the reviews. As output from the trained machine learning model, a review summary that summarizes the set of the reviews associated with the item is obtained.

20 Claims, 9 Drawing Sheets

EFFICIENT GENERATION OF REVIEW SUMMARIES

BACKGROUND

Product reviews can influence other potential consumers of products. As such, potential consumers oftentimes read product reviews to gain a better understanding of a product of interest. Reading through all the reviews, however, can be a time consuming process, particularly for products that are associated with an extensive amount of reviews. Further, reviewing numerous product reviews can unnecessarily consume computing resources. In an effort to facilitate a more efficient review process, in some conventional implementations, a summary of reviews may be provided for a particular product. In such conventional implementations, the summary of reviews is generally manually generated. In particular, oftentimes, editorial staff may download the product (e.g., application), utilize the product, and review the product. In addition to the time consumed to manually generate a summary of reviews, computing resources are unnecessarily consumed. For instance, downloading and using the product (e.g., application, game, movie, website, or the like) for the purposes of preparing a summary review of the product unnecessarily consumes computing resources.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, facilitating efficient generation of review summaries. In this regard, review summaries are efficiently and effectively generated in an automated manner such that the review summaries may be presented to a user. Generating a review summary in an automated manner reduces computing resources utilized to manually generate a review summary. As described herein, in some cases, a generated review summary (ies) may be presented to a potential consumer of an item (e.g., a product). In this way, a potential consumer is presented with a summary of reviews, thereby reducing the additional computing resources consumed by a user reviewing various reviews.

In operation, to efficiently and effectively generate a review summary, a machine learning model is used. As described in association with embodiments described herein, a machine learning model used to generate review summaries in an automated manner may be in the form of a large language model (LLM). In this regard, aspects of the technology described herein facilitate programmatically generating a model prompt (prompt engineering) to input into the machine learning model to attain a desired output in the form of a synthesized review summary. For example, for a review summary associated with a particular item, existing reviews associated with the particular item and context associated with the particular item (e.g., item context) and/or context associated with the reviews (e.g., review context) can be obtained and/or selected and used in the model prompt to facilitate generation of an output in the form of a review summary. Using technology described herein, the review summaries can be concise, accurate, and promote features in a way that appears as though it was manually written by a person or entity that actually used the item (e.g., an application, a game, a move, or the like).

BRIEF DESCRIPTION OF THE DRAWINGS

The technology described herein is described in detail below with reference to the attached drawing figures, wherein:

FIG. 3 provides a graphical user interface including a review summary, in accordance with embodiments of the present technology;

FIGS. 4A-4B provide a graphical user interface for presenting a review summary in association with an item, in accordance with embodiments of the present technology;

DETAILED DESCRIPTION

Figure 1:
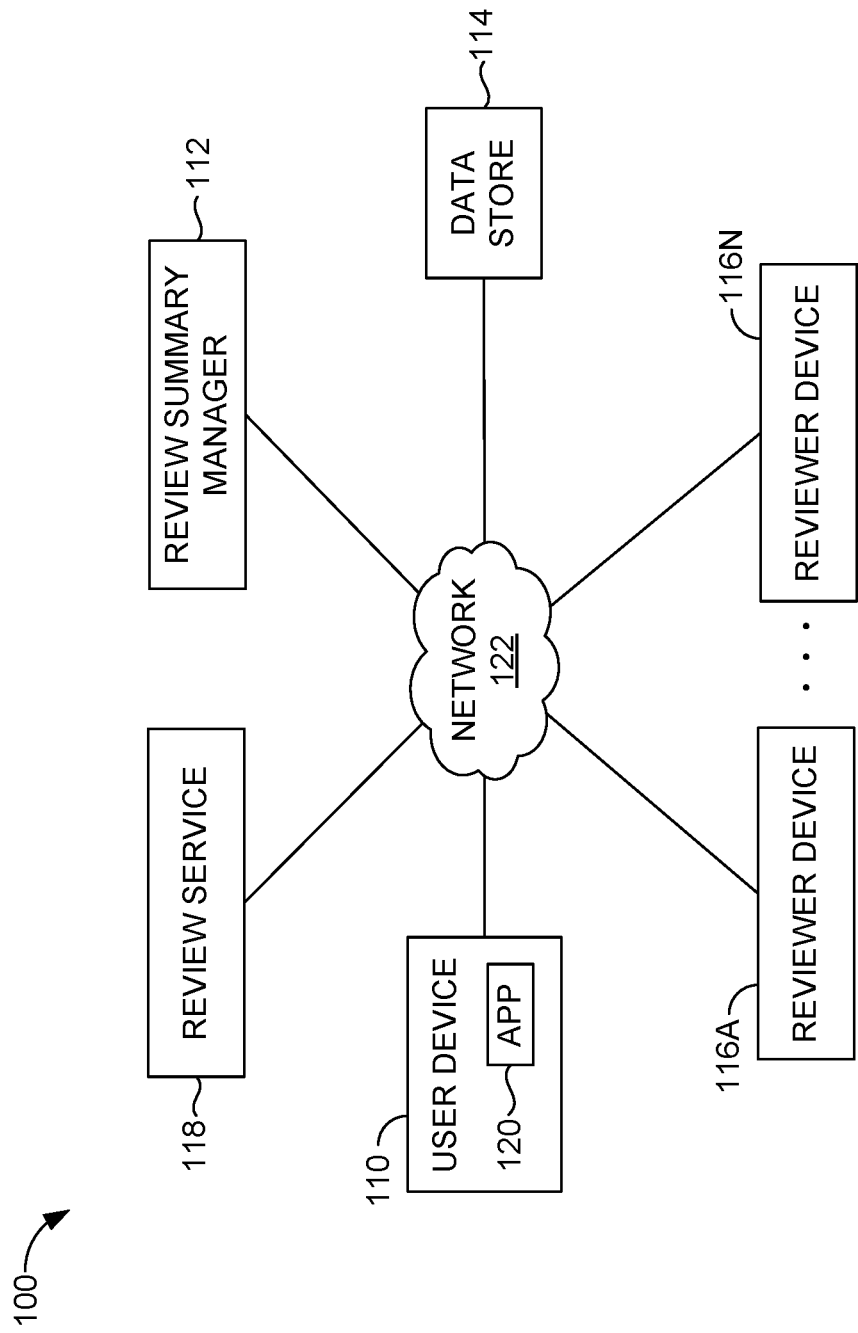
FIG. 1 is a block diagram of an exemplary system for facilitating efficient generation of review summaries, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

Reviews of products may be influential to other potential consumers of the products. For example, positive reviews can influence a potential product consumer to purchase a product. In contrast, negative reviews can dissuade a potential product consumer from purchasing a product. As such, potential consumers oftentimes read product reviews to gain a better understanding of a product of interest. Reading through all the reviews, however, can be a time consuming process, particularly for products that are associated with an extensive amount of reviews. Moreover, existing reviews may be distributed across multiple locations, such as different websites, and also may contain a large volume of reviews that are not helpful for a potential consumer in that these reviews do not provide explanation or supporting detail regarding the features of the product that led to the review. For instance, reviews such "it's good" or "I hated it," reviews that contain obscenities, or reviews that are not relevant to the product, do not help the potential customer to better understand the product. Further still, many of these reviews can be outdated and regard older versions of the product, thus requiring a user to look at the date of the review and have knowledge regarding the current version of the product. Accordingly, reviewing numerous product reviews to locate those reviews that are relevant and helpful to a current product places a burden on the user that can unnecessarily consume computing resources, as well as consume the user's time.

In an effort to facilitate a more efficient review process, in some conventional implementations, a summary of reviews may be provided for a particular product. For example, for an application available for purchase in an application store, a summary of the reviews for the application may be provided. In such conventional implementations, the summary of reviews is generally manually generated. In particular, oftentimes, editorial staff may download the product (e.g., application), utilize the product, and review the product. In some cases, previously provided reviews may be manually reviewed and used to manually author a summary. In addition to the time consumed to manually author a summary of reviews, computing resources are unnecessarily consumed. For instance, downloading and using the product (e.g., application, game, movie, website, or the like) for the purposes of preparing a summary review of the product unnecessarily consumes computing resources.

Accordingly, embodiments of the present technology are directed to efficient and programmatic generation of review summaries. In this regard, review summaries are efficiently and effectively generated in an automated manner such that the review summaries may be presented to a user. Generating a review summary in an automated manner reduces computing resources utilized to manually author a review summary. For example, a product (e.g., an application) does not need to be downloaded and used to generate a review. As another example, computing resources used to manually locate, read, and synthesize a set of reviews into a manually authored review summary are not needed. As described herein, in some cases, a generated review summary(ies) may be presented to a potential consumer of an item (e.g., a product). In this way, a potential consumer is presented with a summary of reviews, thereby reducing the additional computing resources consumed with a user reviewing various reviews.

In operation, to efficiently and effectively generate a review summary, a machine learning model is used. As described in association with embodiments described herein, a machine learning model used to generate review summaries in an automated manner may be in the form of an LLM. In this regard, aspects of the technology described herein facilitate generating a model prompt to input into the machine learning model to attain a desired output in the form of a review summary. For example, for a review summary associated with a particular item, a model prompt is programmatically generated and used to facilitate output in the form of a review summary. The model prompt may be based on reviews associated with the particular item, a context associated with the particular item (e.g., item context), and/or a context associated with the reviews (e.g., review context), which can be obtained and/or selected for generating the model prompt. Using technology described herein, a review summary can be generated to be concise and promote features in a way that appears as though it was manually written by a person or entity that actually used the item (e.g., an application, a game, a move, or the like). In some cases, a review summary may be desired to reflect a positive product insight. For instance, the review summary may be designed to entice consumption of the item. In other cases, a review summary may be desired to reflect a constructive product insight. For instance, the review summary may be designed to provide feedback to the owner or developer of the item and, as such, provide information that can be used to improve or enhance the item. The term "item" is used broadly herein to reflect any type of item that may be reviewed or for which a review may be provided. An item may be a tangible item (e.g., a tangible product, a person, a service, an experience) or an electronic item (e.g., a computer application or app, a website, a game, media, such as a movie or content).

Advantageously, using an LLM to generate review summaries facilitates reducing computing resource consumption, such as computer memory and latency. In particular, review summaries can be accurately generated without requiring training and/or fine-tuning of the model for the particular item or for a particular model output, such as the generated review summary. Utilizing pre-trained models reduces computing resources consumed for performing training. Fine-tuning refers to the process of re-training a pre-trained model on a new dataset without training from scratch. Fine-tuning typically takes weights of a trained model and uses those weights as the initialization value, which is then adjusted during fine-tuning based on the new dataset. Particular embodiments described herein do not need to engage in fine-tuning by ingesting millions of additional data sources and billions of parameters and hyperparameters. As such, the models of various embodiments described herein are significantly more condensed. In accordance with embodiments described herein, the models do not require as much computational resources and/or memory because there is no need to access the billions of parameters, hyperparameters, or additional resources in the fine-tuning phase. As described, all of these parameters and resources must typically be stored in memory and analyzed at runtime and fine-tuning to make predictions, making the overhead extensive and unnecessary.

Further, various embodiments take significantly less time to train and deploy in a production environment because the various embodiments can utilize a pre-trained model that does not require fine-tuning. In effect, the review data (e.g., reviews included in the model prompt) acts as a proxy or otherwise can replace fine-tuning. Accordingly, one technical solution is that embodiments can utilize pre-trained models without requiring fine-tuning. Another technical solution is utilizing the review data as an input prompt for the machine learning model as a proxy to fine-tuning. Each of these technical solutions has the technical effect of improving computing resource consumption, such as computer memory and latency at least because not as much data (e.g., parameters) is stored or used for producing the model output and computational requirements otherwise needed for fine-tuning are not needed.

Another technical solution is receiving or determining an input size constraint of a model and determining the review data based on the input prompt size constraint. Certain models, such as LLMs, are constrained on data input size of a prompt due to computational expenses associated with processing those inputs. This technical solution has the technical effect of improving computing resource consumption, such as computer memory and latency, because not as much review data is stored or used as input for producing output in the form of review summaries.

Overview of Exemplary Environments for Facilitating Efficient Generation of Review Summaries Referring initially to FIG. 1, a block diagram of an exemplary network environment 100 suitable for use in implementing embodiments described herein is shown. Generally, the system 100 illustrates an environment suitable for facilitating efficient generation of review summaries. Among other things, embodiments described herein efficiently generate summaries of reviews of an item. Generally, a review summary may refer to any summary of a set of reviews associated with an item. For example, an item, such as an application, game, media (e.g., movie) or other product, may have a number of reviews provided by various reviewers or consumers of the item. In such a case, a review summary can be generated to summarize the reviews provided by the various reviewers. Reviews may be provided by entities (e.g., individuals) for various items. As such, an item is used broadly herein to reflect any type of an item. By way of example only, an item may be a tangible product, an electronic product, an organization, a service, and/or the like. Electronic products may include, for example, an application, a website, a video game, or the like. Upon reviews being collected in association with a particular item (e.g., a particular product), a review summary can be generated that summarizes the collected reviews, or a portion thereof (e.g., a set of the collected reviews about the particular product). Advantageously, generating and providing a review summary in an efficient manner enables a user viewing an item, or a representation thereof, to have a better understanding of the item without having to manually track down the desired data using various systems and queries thereto.

The network environment 100 includes user device 110, a review summary manager 112, a data store 114, reviewer devices 116*a*-116*n* (referred to generally as review device(s) 116), and review service 118. The user device 110, the review summary manager 112, the data store 114, the review devices 116*a*-116*n*, and review service 118 can communicate through a network 122, which may include any number of networks such as, for example, a local area network (LAN), a wide area network (WAN), the Internet, a cellular network, a peer-to-peer (P2P) network, a mobile network, or a combination of networks.

The network environment 100 shown in FIG. 1 is an example of one suitable network environment and is not intended to suggest any limitation as to the scope of use or functionality of embodiments disclosed throughout this document. Neither should the exemplary network environment 100 be interpreted as having any dependency or requirement related to any single component or combination of components illustrated therein. For example, the user device 110 and reviewer devices 116*a*-116*n* may be in communication with the review summary manager 112 and/or the review service 118 via a mobile network or the Internet, and the review summary manager 112 and/or review service 118 may be in communication with data store 114 via a local area network. Further, although the environment 100 is illustrated with a network, one or more of the components may directly communicate with one another, for example, via HDMI (high-definition multimedia interface), and DVI (digital visual interface). Alternatively, one or more components may be integrated with one another. For example, at least a portion of the review summary manager 112 and/or data store 114 may be integrated with the user device 110, reviewer devices 116, and/or review service 118. For instance, a portion of the review summary manager 112 may be integrated with a user device, while another portion of the review summary manager 112 may be integrated with a review service 118.

The user device 110 can be any kind of computing device capable of facilitating generating and/or providing review summaries. For example, in an embodiment, the user device 110 can be a computing device such as computing device 800, as described above with reference to FIG. 8. In embodiments, the user device 110 can be a personal computer (PC), a laptop computer, a workstation, a mobile computing device, a PDA, a cell phone, or the like.

The user device can include one or more processors, and one or more computer-readable media. The computer-readable media may include computer-readable instructions executable by the one or more processors. The instructions may be embodied by one or more applications, such as application 120 shown in FIG. 1. The application(s) may generally be any application capable of facilitating generating and/or providing review summaries. In some implementations, the application(s) comprises a web application, which can run in a web browser, and could be hosted at least partially server-side (e.g., via a server). In addition, or instead, the application(s) can comprise a dedicated application. In some cases, the application is integrated into the operating system (e.g., as a service).

User device 110 can be a client device on a client-side of operating environment 100, while review summary manager 112 and/or review service 118 can be on a server-side of operating environment 100. Review summary manager 112 and/or review service 118 may comprise server-side software designed to work in conjunction with client-side software on user device 110 so as to implement any combination of the features and functionalities discussed in the present disclosure. An example of such client-side software is application 120 on user device 110. This division of operating environment 100 is provided to illustrate one example of a suitable environment, and it is noted there is no requirement for each implementation that any combination of user device 110, review summary manager 112, and/or review service 118 to remain as separate entities.

In an embodiment, the user device 110 is separate and distinct from the review summary manager 112, the data store 114, the reviewer devices 116, and the review service 118 illustrated in FIG. 1. In another embodiment, the user device 110 is integrated with one or more illustrated components. For instance, the user device 110 may incorporate functionality described in relation to the review summary manager 112 and/or review service 118. For clarity of explanation, embodiments are described herein in which the user device 110, the review summary manager 112, the data store 114, the reviewer devices 116, and the review service 118 are separate, while understanding that this may not be the case in various configurations contemplated.

As described, a user device, such as user device 110, can facilitate generating and/or providing review summaries. Review summaries are generally provided in the form of text, but other types of data may additionally or alternatively be used to provide a review summary.

A user device 110, as described herein, is generally operated by an individual or entity that initiates generation and/or viewing of a review summary(s). In some cases, such an individual may be a contributor or programmer of code, a product designer, a website designer, an application designer, an item marketer, and/or the like. In this regard, the user may be interested in constructive item insights, for example, to understand how to enhance or improve the corresponding item. In other cases, such an individual may be a person interested in or a potential consumer of an item. For example, a potential consumer of an application may navigate to an application store. Based on navigating to the application store, and/or searching for a particular application, the user may be provided with a review summary for the particular application.

In some cases, generation or provision of review summaries may be initiated at the user device 110. For example, in some cases, a user may directly or expressly select to generate or view a review summary(s) related to an item. For instance, a user desiring to view a constructive item insight may specify a desire to view a review summary. To this end, a user of the user device 110 that may initiate generating and/or providing of a review summary(s) is a user that performs some aspect of item development, marketing, or the like (e.g., via a link or query). As another example, a user viewing an item (e.g., a potential product to purchase) may select a link or icon to view a review summary associated with the item. In other cases, a user may indirectly or implicitly select to generate or view a review summary(s) related to an item. For instance, a user may navigate to a media store application or website. Based on the navigation to the media store application or website, the user may indirectly indicate to generate or view a review summary. In some cases, such an indication may be based on generally navigating to the application or website. For instance, a review summary may be requested for each item to be presented in the application or website or for a particular item(s) being features or promoted. In other cases, such an indication may be based on selecting a particular product.

Generating and/or providing review summaries may be initiated and/or presented via an application 120 operating on the user device 110. In this regard, the user device 110, via an application 120, might allow a user to initiate generation or presentation of a review summary(s). The user device 110 can include any type of application and may be a stand-alone application, a mobile application, a web application, or the like. In some cases, the functionality described herein may be integrated directly with an application or may be an add-on, or plug-in, to an application. One example of an application that may be used to initiate and/or present review summaries includes any application in communication with a review service, such as review service 118.

Review service 118 may be any service that provides or includes reviews associated with items. By way of example, a review service may include an application store, a media store, an e-commerce store, or the like. In these examples, the review services provide various items (e.g., for consumption) and can include reviews associated with the items. For example, a review service may be or include an e-commerce service that provides various items or products (e.g., for sale). An individual may view various products (e.g., tangible products or electronic products) and select to purchase or obtain a product or set of products. In the item offering, the review service includes or provides various reviews input for the products, such that a potential consumer can view other individuals or entities perspectives on the corresponding products. Further, the review service may offer opportunities for individuals or entities (e.g., prior consumers of the item) to provide their reviews or feedback, for example, via text input and/or images.

Although embodiments described above generally include a user or individual inputting or selecting (either expressly or implicitly) to initiate or view review summaries, as described below, such initiation may occur in connection with a review service, such as review service 118. For example, review service 118 may initiate generation of review summaries on a periodic basis. Such review summaries can then be stored and, thereafter, accessed by the review service 118 to provide to a user device for viewing (e.g., based on a user navigating to a particular application in an application store).

The user device 110 can communicate with the review summary manager 112 and/or review service 118 to initiate generation of a review summary(s) and/or obtain a review summary(s). In embodiments, for example, a user may utilize the user device 110 to initiate generation of review summaries via the network 122. For instance, in some embodiments, the network 122 might be the Internet, and the user device 110 interacts with the review summary manager 112 (e.g., directly or via another service such as the review service 118) to initiate generation of review summaries. In other embodiments, for example, the network 122 might be an enterprise network associated with an organization. It should be apparent to those having skill in the relevant arts that any number of other implementation scenarios may be possible as well.

With continued reference to FIG. 1, the review summary manager 112 can be implemented as server systems, program modules, virtual machines, components of a server or servers, networks, and the like. At a high level, the review summary manager 112 manages generation of review summaries in association with items. In particular, the review summary manager 112 can obtain various review data, such as reviews, review context, item context, user data, reviewer data, and/or review weights. Using the review data, the review summary manager 112 can generate a model prompt to initiate generation of a review summary. As one example, a model prompt may include various reviews associated with a particular item. The model prompt can be input into an LLM to obtain, as output, a review summary in association with reviews provided in relation to a particular item. Such reviews used as a basis for generating a review summary may be reviews submitted via reviewer devices 116. Review devices 116a-116n may be any type of computing devices at which a reviewer may provide a review(s) in association with an item (e.g., a product, a computer application, a service, an experience, a website, or other item for which a user may desire to provide a review). For example, upon an individual purchasing or using an item, the individual may provide a review of the time (e.g., via the review device). The review provided via the reviewer device may be provided to the review service 118 that collects reviews for subsequent presentation to potential consumers.

In embodiments, the review summary manager 112 preprocesses review data such that the review data included in the model prompt is more effective in generating a desired output. For example, various reviews may be filtered out or removed based on date, negative content, review ratings, and/or the like.

In accordance with generating a review summary, the review summary manager 112 outputs the review summary. In some cases, the review summary manager 112 outputs a review summary(s) to user device 110. For example, assume a user is viewing a particular item via application 120 operating on user device 110. In such a case, the review summary associated with the particular item may be provided to the user device 110. In other cases, the review summary manager 112 outputs a review summary(s) to another service, such as review service 118, or a data store, such as data store 114. For example, upon generating a review summary or set of review summaries, the review summary(s) can be provided to review service 118 and/or data store 114 for subsequent use. For instance, when a user subsequently views a particular item via application 120 on user device 110, the review service 118 may provide review summary to the user device.

As described, the review service 118 may be any service that provides or includes reviews associated with items. By way of example, a review service may include an application store, a media store, an e-commerce store, or the like. In these examples, the review services provide various items (e.g., for consumption) and can include reviews associated with the items. For example, a review service may be or include an e-commerce service that provides various items or products (e.g., for sale). In this regard, the review service 118 may communicate with user device 110, for example, via application 120, to present various items, reviews, and/or review summaries for display. For instance, review service 118 may communicate with application 120 operating on user device 110 to provide back-end services to application 120.

As can be appreciated, in some cases, the review summary manager 112 may be a part of, or integrated with, the review service 118. In this regard, the review summary manager may function as portion of the review service 118. In other cases, the review summary manager 112 may be independent of, and separate from, the review service 118. Any number of configurations may be used to implement aspects of embodiments described herein.

Advantageously, utilizing implementations described herein enable generation and presentation of review summaries to be performed in an efficient manner. Further, the generated review summaries can dynamically adapt to align with more recent reviews provided by reviewers. As such, a user can view desired and up-to-date information about an item.

Figure 2:
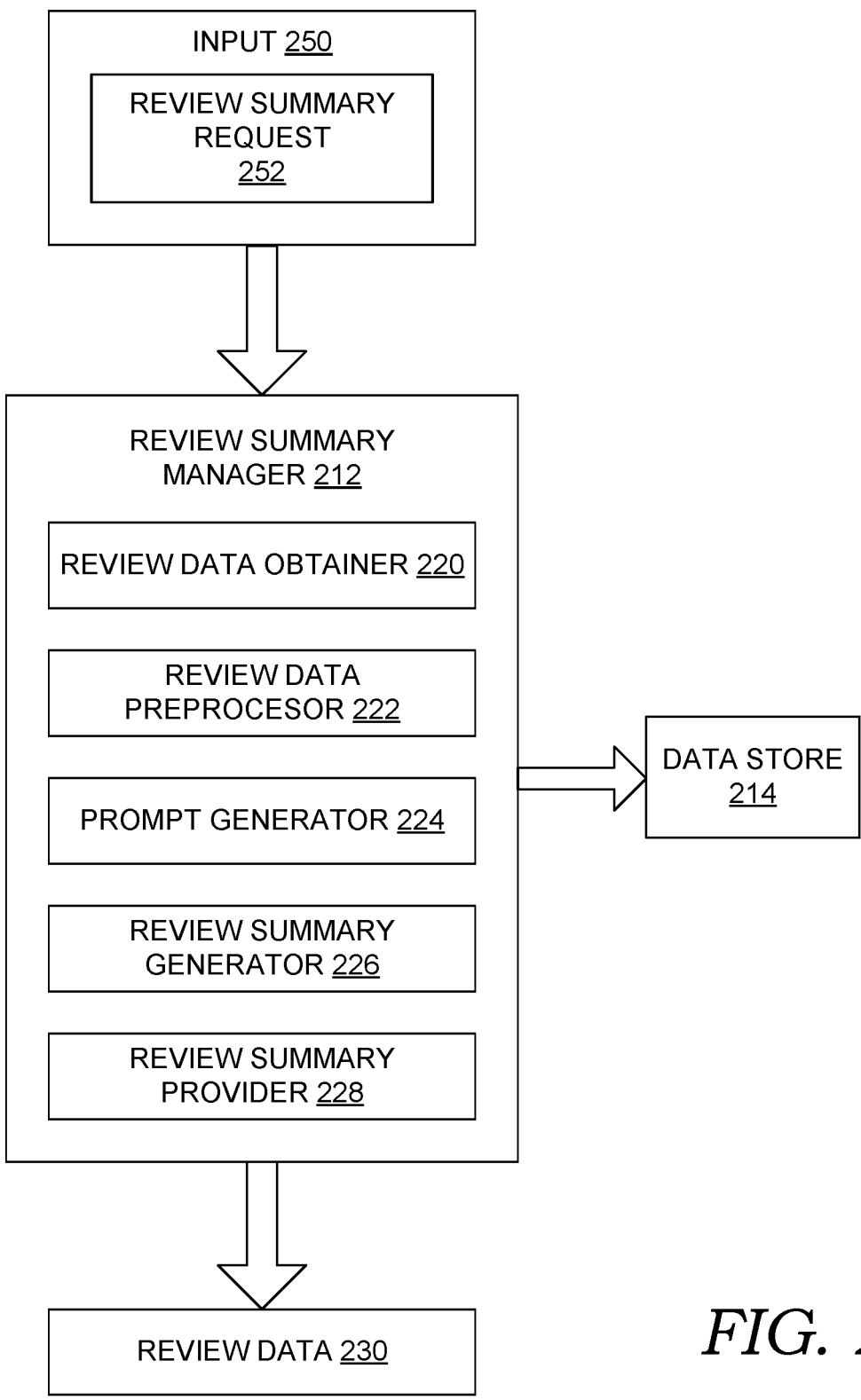
FIG. 2 is an example an example implementation for facilitating efficient generation of review summaries, via a review summary manager, in accordance with aspects of the technology described herein.

Turning now to FIG. 2, FIG. 2 illustrates an example implementation for generating and/or providing review summaries, via review summary manager 212. The review summary manager 212 can communicate with the data store 214. The data store 214 is configured to store various types of information accessible by the review summary manager 212 or other server. In embodiments, user devices (such as user devices 110 of FIG. 1), reviewer devices (such as reviewer devices 116 of FIG. 1), a review service (such as review service 118 of FIG. 1), and/or servers or services can provide data to the data store 214 for storage, which may be retrieved or referenced by any such component. As such, the data store 214 may store reviews, review context, item context, user data, reviewer data, review weights, and/or the like. In addition, data store 214 may store generated review summaries, which can then be accessed for subsequent use or display.

In operation, the review summary manager 212 is generally configured to manage generation and/or provision of review summaries. In embodiments, the review summary manager 212 includes a review data obtainer 220, a review data preprocessor 222, a prompt generator 224, a review summary generator 226, and a review summary provider 228. According to embodiments described herein, the review summary manager 212 can include any number of other components not illustrated. In some embodiments, one or more of the illustrated components 220, 222, 224, 226, and 228 canbe integrated into a single component or can be divided into a number of different components. Components 220, 222, 224, 226, and 228 can be implemented on any number of machines and can be integrated, as desired, with any number of other functionalities or services.

The review summary manager 212 may receive input 250 to initiate generation and/or provision of a review summary(s). Input 250 may include a review summary request 252. A review summary request 252 generally includes a request or indication to generate a review summary. A review summary request may specify, for example, an indication of an item for which a review summary is desired, an indication of a set of reviews for which a review summary is desired, an indication of the user to which the review summary is to be presented, and/or the like.

A review summary request 252 may be provided by any service or device. For example, in some cases, a review summary request 252 may be initiated and communicated via a user device, such as user device 110 of FIG. 1. For example, assume a user accesses a website or an application having one or more items associated therewith (e.g., presented via the website or application). In such a case, a review summary request 252 may be initiated that includes a request to generate a summary request for one or more items. For instance, in one example, the review summary request 252 may specify eachitem associated with the website or application. In another example, the review summary request 252 may specify a particular set of items for which a review summary is desired, such as the items initially presented via the application or website, or an item selected or otherwise identified in association with a user interest (e.g., a user pauses scrolling over the item or selecting the item). In another example, a user may be an individual or entity associated with a particular item (e.g., a manufacturer, developer, marketer, or provider of the item). In such a case, the user may select to view a review summary associated with the particular item such that the user can obtain constructive insights related to the item. In this way, the user may view the review summary to identify opportunities to improve or enhance the item.

Alternatively or additionally, a review summary request 252 may be initiated and communicated via an administrator device, such as administrator device review service 118 of FIG. 1. For example, assume a review service 118 provides a website that presents reviews associated with various items. An administrator of the website may initiate a review summary request 252 to generate review summaries. Such review summaries may be stored for later presentation to users. In other cases, a review summary request 252 may be automatically initiated and communicated via a service, such as review service 118. For example, a website or application service, such as review service 118, associated with item presentation may automatically initiate generation of review summaries, for instance, based on a lapse of a time period, a reception of a review or set of reviews (e.g., upon obtaining a predetermined number of reviews), or other criteria. As can be appreciated, the automated initiation of a review summary generation may be dynamic, for instance, based on attributes associated with the item. For example, in cases in which reviews are more frequently provided, a review summary request may be initiated more frequently, whereas when reviews for an item are less frequently provided by reviewers, the review summary request for an item may be initiated less frequently.

Although not illustrated, input 250 may include other information communicated in association with a review summary request 252. For example, and as described below as one implementation, review data, such as reviews, review context, item context, user data, reviewer data, and/or review weights, may be provided in association with the review summary request. For instance, in some cases, an administrator may provide an indication of an item and a set of reviews, which is communicated in association with a review summary request to initiate generation of a review summary.

The review data obtainer 220 is generally configured to obtain review data. In this regard, in some cases, the review data obtainer 220 obtains review data in accordance with obtaining a review summary request, such as review summary request 252. Review data generally refers to any data associated with a review and/or used to generate a review summary. In this regard, review data may include, but is not limited to, reviews, review context, item context, user data, reviewer data, review weights, and/or the like. Reviews refer to the text, images, videos, or other data provided as a review or comments in association with an item. A review may include a rating (e.g., a numerical rating, a number of stars, grade, or an indication of score). As described, a review may be generated or input for any type of item, such as products, websites, applications, media (e.g., movies), games, and/or the like. Review context may include any context associated with a review. For example, a reviewer identifier (e.g., a name or other unique identifier identifying the reviewer), a date/time associated with a review, and/or the like. Item context generally refers to context associated with an item for which the review was generated. For example, assume a review was generated for a particular application. In such a case, item context may include a release date of the particular application, a version of the particular application, a publisher of the particular application, or other contextual information regarding the item. User data generally refers to any data associated with a user, for example, that initiated and/or may view a review summary. For instance, user data may include demographics associated with the user, user preferences, and/or the like (e.g., via a user profile). Reviewer data generally refers to any data associated with a reviewer. For example, for a reviewer that provided a review of an item, reviewer data may include demographic data associated with the reviewer, preferences associated with the reviewer, indications of purchases or uses associated with the item the reviewer purchased or used, and/or the like. Review weights generally refer to weights, ranks, or scales associated with the review. A review may be weighted based on any number of attributes including, for example, other input (e.g., positive feedback, e.g., likes, or negative feedback, e.g., dislikes, associated with a review).

The review data obtainer 220 can receive or obtain review data from various sources for utilization in determining review summaries. As described above, in some cases, review data may be obtained as input 250 along with the review summary request 252. For example, in some implementations, a user (e.g., an administrator) may input or select review data, or a portion thereof, via a graphical user interface for use in generating review summaries. For instance, a user, operating via a user device, desiring to review a constructive item insight may select or input a set of reviews associated with an item or set of items for use in generating corresponding review summaries.

Additionally or alternatively, the review data obtainer 220 may obtain review data from any number of sources or data stores, such as data store 214. In this regard, in accordance with initiating generation of a review summary, the review data obtainer 220 may communicate with a data store(s) or other data source(s), including a review service (e.g., review service 118 of FIG. 1) and obtain review data to generate a review summary(s). Such review data that may be obtained includes, for example, reviews, review context, item context, user data, reviewer data, review weights, and/or the like. Data store 214 illustrated in FIG. 2 may include such review data, but any number of data stores and/or data sources may provide various types of review data. Such data stores and data sources may include public data, private data, and/or the like. For instance, a website service may store data associated with various items, including reviews associated with the items.

In some cases, the review data obtainer 220 may identify a type or extent of review data to obtain. For example, assume a review summary request 252 corresponds with an indication of a set of products. For instance, a website service associated with a set of products may provide a review summary request indicating each product or a portion of the products. Upon identifying the products, the review data obtainer 220 may obtain reviews associated with the specified products (e.g., by accessing data associated with the website service or data store). As another example, assume a review summary request 252 is provided upon a user accessing an application store. In such a case, the review data obtainer 220 may obtain user data associated with the particular user accessing the application store. In some cases, the review data obtainer 220 may obtain review data associated with a particular product identified in association with the user accessing the application store (e.g., a user selection of the particular product, a user hovering over the particular product, or a user search of the particular product).

The particular type of data obtained by the review data obtainer 220 may vary depending on the particular configuration implemented. For example, in some cases, in accordance with obtaining a set of reviews, a set of corresponding review weights may also be obtained. In some embodiments, review weights may be determined using a machine learning model. For example, in some cases, a large language model (e.g., an LLM associated with the review summary generator 226) may be used to generate review weights. In this regard, a prompt may be generated with an instruction to generate weights for a set of reviews. The prompt can be input into the LLM to generate weights for the set of reviews. In this regard, an iterative process is performed in that an LLM is initially used to generate weights for a set of reviews (e.g., via a prompt instructing to generate review weights) and, thereafter, the LLM is used to generate a review summary for the set of reviews in accordance with the weights (e.g., via a prompt instructing to generate a review summary).

In other cases, review weights may be subsequently determined (e.g., via the review data preprocessor 222) and, as such, are not obtained via the review data obtainer 220. As another example, in some cases, user data and reviewer data (or other types of data) is not used in generating a review summary and, as such, is not obtained by the review data obtainer 220. The examples of types of data obtained by the review data obtainer 220 are not intended to be restrictive. In this regard, the review data obtainer 220 may obtain more or less, or different, types of review data.

The review data obtainer 220 may also obtain any amount of review data. For example, in some cases, each review associated with a particular item may be obtained. In other cases, only a portion of the reviews associated with a particular item may be obtained. The type and amount of review data obtained by review data obtainer 220 may vary per implementation and is not intended to limit the scope of embodiments described herein.

The review data preprocessor 222 is generally configured to preprocess review data, or a portion thereof. The review data preprocessor 222 may preprocess review data in any number of ways to effectuate a more efficient and effective review summary prompt. As described herein, a model prompt is generated to initiate generation of a review summary(s). As such, the review data preprocessor 222 may preprocess various review data to optimize the review data included in a model prompt. To this end, the more intentional or targeted the review data included in the model prompt, the more effective and efficient a review summary is generated.

In one embodiment, the review data preprocessor 222 preprocesses review data by removing or filtering data. In this regard, the review data preprocessor 222 can filter out or remove particular reviews. As one example, the review data preprocessor 222 may filter out reviews associated with ratings below a threshold. For example, in many cases, when a reviewer provides a review, the reviewer may provide a rating associated with the item (e.g., between one and five stars) to indicate an extent of satisfaction association with the item. In some implementations, the review data preprocessor 222 may remove reviews associated with ratings below a threshold number, such as three stars or four stars. In this regard, the review summary generated is more likely to fall in line with more positive reviews, thereby providing a more positive item insight. Filtering of data, such as reviews, may depend on the target or intent of the review summary. For instance, in cases in which a positive item insight is desired, removing reviews with ratings below a threshold may be employed. On the other hand, in cases in which a constructive item insight is desired, reviews with ratings above a threshold (e.g., four stars) may be removed.

Another example of filtering data includes removing reviews associated with a particular level of review feedback. Review feedback, as used herein, refers to other users or customer reviews or indications of a review. For example, in some services, an individual reading a review may include a thumbs up to support the review or indicate the review was helpful (e.g., provide a positive or "like" review feedback), while a thumbs down may be used to disagree with the review or indicate the review was unhelpful (e.g., provide a negative or "dislike" review feedback). In such a case, a review with negative feedback or an extent of negative review (e.g., threshold level of review) may be removed. For example, in cases where more than 50% of the review feedback is negative, the corresponding review may be removed.

Another example of filtering review data may include filtering reviews having negative content or language, such as profanity or other inappropriate language. In this way, the review data preprocessor 222 may identify negative content or language and remove reviews having the negative content. Any technology may be used to identify such negative content, including, for example, machine learning technology.

In some cases, rather than removing a review in its entirety, the review may be edited or modified as desired. For example, sentences including negative language may be removed from the review.

In some embodiments, the review data preprocessor 222 may generate weights for reviews. Review weights may be generated for use by review summary generator 226 to generate a review summary. To this end, a weight provides an indication of focus of reviews for generating output. A review weight may be in any number of forms, including a numerical weight. The review data preprocessor 222 may generate a weight based on any number or type of data. As one example, a review weight may be generated in association with review feedback. As described, review feedback refers to any feedback or score associated with a review. For example, review feedback can be provided by one or more individuals or entities that did not prepare the review. In this regard, a review with five positive review feedback and a review with two negative review feedback may be used to generate a weight for the review summary. Other aspects may be additionally or alternatively used by the review data preprocessor 222 to generate a weight. For example, a date associated with a review may be used to weight the review (e.g., more recently dated reviews are assigned a higher weight). As another example, reviews provided by reviewers that have a particular attribute may be weighted higher. For instance, a reviewer sharing a common attribute with a user may result in a higher-weighted review, a reviewer providing a threshold number of reviews on items may result in a higher-weighted review, and/or the like.

Filtering and weighting reviews are only examples of different data preprocessing that the review data preprocessor 222 may perform. As can be appreciated, various other types of data preprocessing are contemplated within the scope of embodiments described herein.

The prompt generator 224 is generally configured to generate model prompts. As used herein, a model prompt generally refers to an input, such as a text input, that can be provided to review summary generator 226, such as an LLM, to generate an output in the form of a review summary(s). In embodiments, a model prompt generally includes text to influence a machine learning model, such as an LLM, to generate text having a desired content and structure. The model prompt typically includes text given to a machine learning model to be completed. In this regard, a model prompt generally includes instructions and, in some cases, examples of desired output. A model prompt may include any type of information. In accordance with embodiments described herein, a model prompt may include various types of review data. In particular, a model prompt generally includes reviews. Such reviews may be preprocessed via review data preprocessor 222, as described herein. For example, in some cases, reviews may be filtered out of a set of candidate reviews based on a review ranking, negative language, and/or the like.

In embodiments, the prompt generator 224 is configured to select a set of reviews for which to use to generate review summaries. For example, assume a review summary is to be generated for a particular item and each of the reviews associated with the particular item are obtained. In such a case, the review data preprocessor 222 may select a set of reviews to provide for generating the review summary. In this way, after various reviews are filtered or updated to remove unwanted data, the review data preprocessor 222 may select a set of reviews from the remaining reviews.

Reviews may be selected based on any number or type of criteria. As one example, reviews may be selected to be under a maximum number of tokens required by a review summary generator, such as an LLM. For example, assume an LLM includes a 3000 token limit. In such a case, reviews totaling less than the 3000 token limit may be selected. Such review selection may be based on, for example, recency of the review such that more recent reviews are selected. In other cases, reviews may be selected to correspond with a recent version of the item. In yet other cases, reviews may be selected based on weights (e.g., highest weights, equal distribution of weights, or other criteria associated with a weight). For instance, a review may be selected based on a corresponding weight that is an indication of the helpfulness of the review according to other people who have read the review.

In addition to the model prompt including reviews, additional review data may be included, such as, for example, review context, item context, user data, reviewer data, and review weights. As described, review weights associated with corresponding reviews can be provided in the model prompt to indicate an emphasis or focus to place on corresponding reviews in generating a review summary. For example, reviews having more positive review feedback may be more desired for consideration when generating a review summary and, as such, have a higher weight. As such, in accordance with including reviews in a model prompt, the corresponding model weights can also be included. Other types of information to include in a model prompt may specify item context. For example, an indication of the item to which the reviews correspond may be indicated. Additional item context may be included, such as promotions associated with the item, item details indicating attributes of the item, and/or the like may also be provided. Review context (e.g., date of review, reviewer of review), user data, reviewer data, and/or the like can additionally or alternatively be included in the model prompt, depending on the desired implementation or output.

In addition to including review data, a model prompt may also include output attributes. Output attributes generally indicate desired aspects associated with an output, such as a review summary. For example, an output attribute may indicate a target type of output, such as positive or negative item insight. As another example, an output attribute may indicate a length of output. For example, a model prompt may include an instruction for a desired one paragraph or three paragraphs. Any other instructions indicating a desired output are contemplated within embodiments of the present technology. As another example, an output attribute may indicate a target language for generating the output. For example, the reviews may be provided in one language (or a variety of languages), and an output attribute may indicate to generate the output in another language (or a single language).

The prompt generator 224 may format the review data and output attributes in a particular form or data structure. One example of a data structure for a model prompt is as follows:
Item
Item Details
Output Attributes
Review 1; Weight 1
Review 2; Weight 2
Review N; Weight N As described, in embodiments, the prompt generator 224 generates or configures model prompts in accordance with size constraints associated with a machine learning model. As such, the prompt generator 224 may be configured to detect the input size constraint of a model, such as an LLM or other machine learning model. Various models are constrained on a data input size they can ingest or process due to computational expenses associated with processing those inputs. For example, a maximum input size of 14096 tokens (for davinci models) can be programmatically set. Other input sizes may not necessarily be based on token sequence length, but other data size parameters, such as bytes. Tokens are pieces of words, individual sets of letters within words, spaces between words, and/or other natural language symbols or characters (e.g., %, $, !). Before a language model processes a natural language input, the input is broken down into tokens. These tokens are not typically parsed exactly where words start or end—tokens can include trailing spaces and even sub-words. Depending on the model used, in some embodiments, models can process up to 4097 tokens shared between prompt and completion. Some models (e.g., GPT-3) take the input, convert the input into a list of tokens, process the tokens, and convert the predicted tokens back to the words in the input. In some embodiments, the prompt generator 224 detects an input size constraint by simply implementing a function that calls a routine that reads the input constraints.

The prompt generator 224 can determine which data, for example, obtained by the preview data obtainer 220, preprocessed by the review data preprocessor, or the like is to be included in the model prompt. In some embodiments, the prompt generator 224 takes as input the input size constraint and the review data to determine what and how much data to include in the model prompt. By way of example only, assume a model prompt is being generated in relation to a particular item. Based on the input size constraint, the prompt generator 224 can select which data, such as reviews, to include in the model prompt. As described, such a data selection may be based on any of a variety of aspects, such as data of reviews, weights of reviews, rankings associated with reviews, reviewers providing the review, and/or the like. As one example, the prompt generator 224 can first call for the input size constraint of tokens. Responsively, the prompt generator 224 can then tokenize each of the review candidates to generate tokens and, thereafter, responsively and progressively add each data set ranked/weighted from highest to lowest if and until the token threshold (indicating the input size constraint) is met or exceeded, at which point the prompt generator 224 stops.

The prompt generator 224 may generate any number of model prompts. As one example, an individual model prompt may be generated for a particular item. In this way, a one-to-one model prompt may be generated for a corresponding item. As another example, a particular model prompt may be generated to initiate review summaries for multiple items. For instance, a model prompt may be generated to include an indication of a first item and corresponding reviews, a second item and corresponding views, and so on.

The review summary generator 226 is generally configured to generate review summaries. In this regard, the review summary generator 226 utilizes various review data, such as previously provided reviews of an item, to generate a review summary associated with the item. In embodiments, the review summary generator 226 can take, as input, a model prompt or set of model prompts generated by the prompt generator 224. Based on the model prompt, the review summary generator 226 can generate a review summary or set of review summaries associated with the item(s) indicated in the model prompt. For example, assume a model prompt includes a set of reviews associated with a particular item. In such a case, the review summary generator 226 generates a review summary associated with the particular item based on the set of reviews included in the model prompt.

Advantageously, as the review summary is generated based on prior reviews associated with the item, the review summary is generally generated using language that provides an indication of first-hand knowledge or usage of the item. As such, the review summary can have more influence or provide more constructive insight to potential consumers and item providers. Further, the review summary is generated in accordance with desired output attributes, thereby efficiently generating an effective review summary.

The review summary generator 226 may be or include any number of machine learning models or technologies. In some embodiments, the machine learning model is an LLM. A language model is a statistical and probabilistic tool which determines the probability of a given sequence of words occurring in a sentence (e.g., via next sentence prediction (NSP) or masked language model (MLM)). Simply put, it is a tool which is trained to predict the next word in a sentence. A language model is called a large language model when it is trained on enormous amount of data. In particular, a LLM refers to a language model including a neural network with an extensive amount of parameters that is trained on an extensive quantity of unlabeled text using self-supervising learning. Oftentimes, LLMs have a parameter count in the billions, or higher. Some examples of LLMs are GOOGLE's BERT and OpenAI's GPT-2, GPT-3, and GPT-4. For instance, GPT-3 is a large language model with 175 billion parameters trained on 570 gigabytes of text. These models have capabilities ranging from writing a simple essay to generating complex computer codes-all with limited to no supervision. Accordingly, an LLM is a deep neural network that is very large (billions to hundreds of billions of parameters) and understands, processes, and produces human natural language by being trained on massive amounts of text. In embodiments, an LLM performs automatic summarization (or text summarization). Such automatic summarization includes the process of NLP text summarization, which is the process of breaking down text (e.g., several paragraphs) into smaller text (e.g., one sentence or paragraph). This method extracts vital information while also preserving the meaning of the text. This reduces the time required for grasping lengthy text content without losing vital information. An LLM can also perform machine translation, which includes the process of using machine learning to automatically translate text from one language to another without human involvement. Modern machine translation goes beyond simple word-to-word translation to communicate the full meaning of the original language text in the target language. It analyzes all text elements and recognizes how the words influence one another. Although some examples provided herein include a single-mode generative model, other models, such as multi-modal generative models, are contemplated within the scope of embodiments described herein. Generally, multi-modal models are generated to make predictions based on different types of modalities (e.g., text and images).

As such, as described herein, the review summary generator 226, in the form of an LLM, can obtain the model prompt and, using such information in the model prompt, generate a review summary for an item or set of items. In some embodiments, the review summary generator 226 takes on the form of an LLM, but various other machine learning models can additional or alternatively be used.

The review summary provider 228 is generally configured to provide review summaries. In this regard, upon generating a review summary(s), the review summary provider 228 can provide such data, for example for display via a user device. To this end, in cases in which the review summary manager 212 is remote from the user device, the review summary provider 228 may provide a review summary(s) to a user device for display to a user that initiated the request for viewing a review summary(s). In embodiments, the review summary is generated and provided for display in real time. In this way, in response to an indication to generate a review summary (e.g., directly or indirectly initiating a review summary by interacting with an application or website having items), a review summary is generated and provided to the user in real time. In some cases, to the extent the user views the item at a later time, the review summary can be updated in real time by performing generation or updating of the review summary (e.g., based on more recent reviews) and providing the updated review summary in real time for viewing. In this way, at a first time of viewing an item, a user may view one version of a review summary associated with an item, and at a second subsequent time of viewing the same item, the user may view another, more updated, version of a review summary.

Alternatively or additionally, the review summary may be provided to a data store for storage or another component or service, such as a review service (e.g., review service 118 of FIG. 1). Such a component or service may then provide the review summary for display, for example, via a user device. For instance, as described herein, in some cases, review summaries may be generated in a periodic manner. As one example, review summaries may be generated for a set of items in off-hours (hours in which computing resources are more available and not used by other processes). Such review summaries can then be stored, for example in data store 214. Thereafter, assume a user navigates, via a user device, to a website or application providing various items and corresponding reviews. In association with navigating to the website/application, or a particular item associated therewith, a review service can access an appropriate review summary (e.g., corresponding with the particular item) and provide the review summary for display in association with the corresponding item.

The review summary may be provided for display in any number of ways. In some examples, the review summary is provided in association with the corresponding item listing. For example, an item may be presented with corresponding data, including reviews, ratings, details, or other information associated with the item. In addition to the item, and other corresponding information, a review summary may also be presented. In some cases, the review summary is automatically displayed in association with the item. In other cases, a user may select to view the review summary. For instance, a link may be presented that, if selected, presents the review summary (e.g., integrated with the item description or details, or provided in a separate window or pop-up text box).

As such, the review summary 230 can be provided as output from the review summary manager 212. As described, the review summary 230 may be provided to a user device for real time display. Alternatively or additionally, the review data 230 can be provided to the data store 214 and/or other service or system (e.g., review service).

Exemplary Implementations for Efficiently Generating Review Summaries

Figure 3:
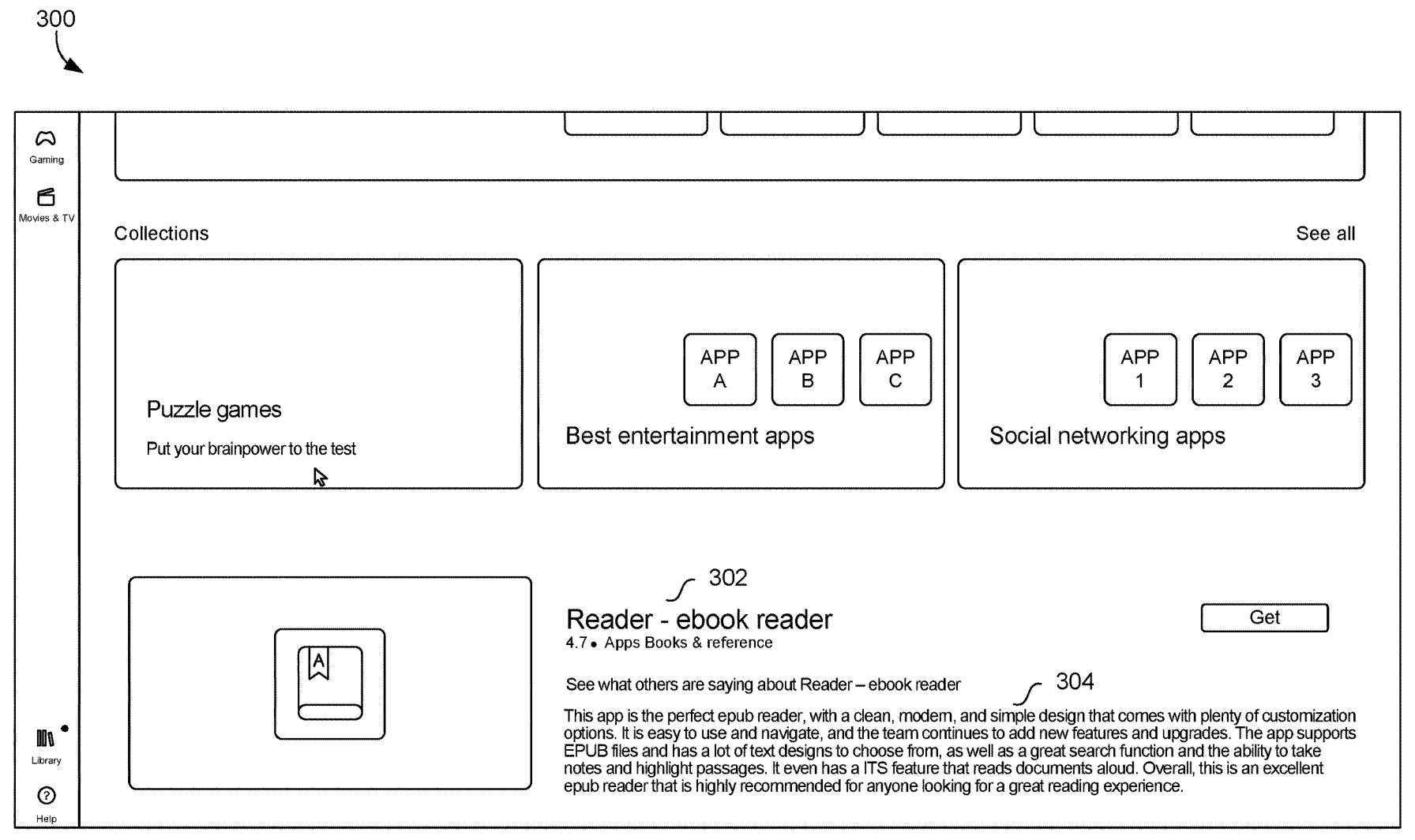

FIGS. 3-4 provide example graphical user interfaces that illustrate various aspects of embodiments described herein. As shown, FIG. 3 provides one example online store 300 that enables purchasing of various items, such as various products and services (e.g., applications, media, games, or other items). In this example, an item 302 is shown. Item 302 represents a computer application, but the item may be any other type of item, including a tangible item (e.g., a speaker, a clothing item, or the like). The item 302 may be presented in various ways. For example, in some cases, a user may navigate to the item 302, for example, by inputting a search query, by searching items via a category (e.g., entertainment applications), or the like. As another example, the item 302 may be presented as a featured item. In accordance with presenting an identification of the item 302, among other details, a review summary 304 is presented. As described, the review summary 304 is generated via implementations described herein, and can reflect or represent various aspects of previously provided reviews of the item 302.

Figure 4A:
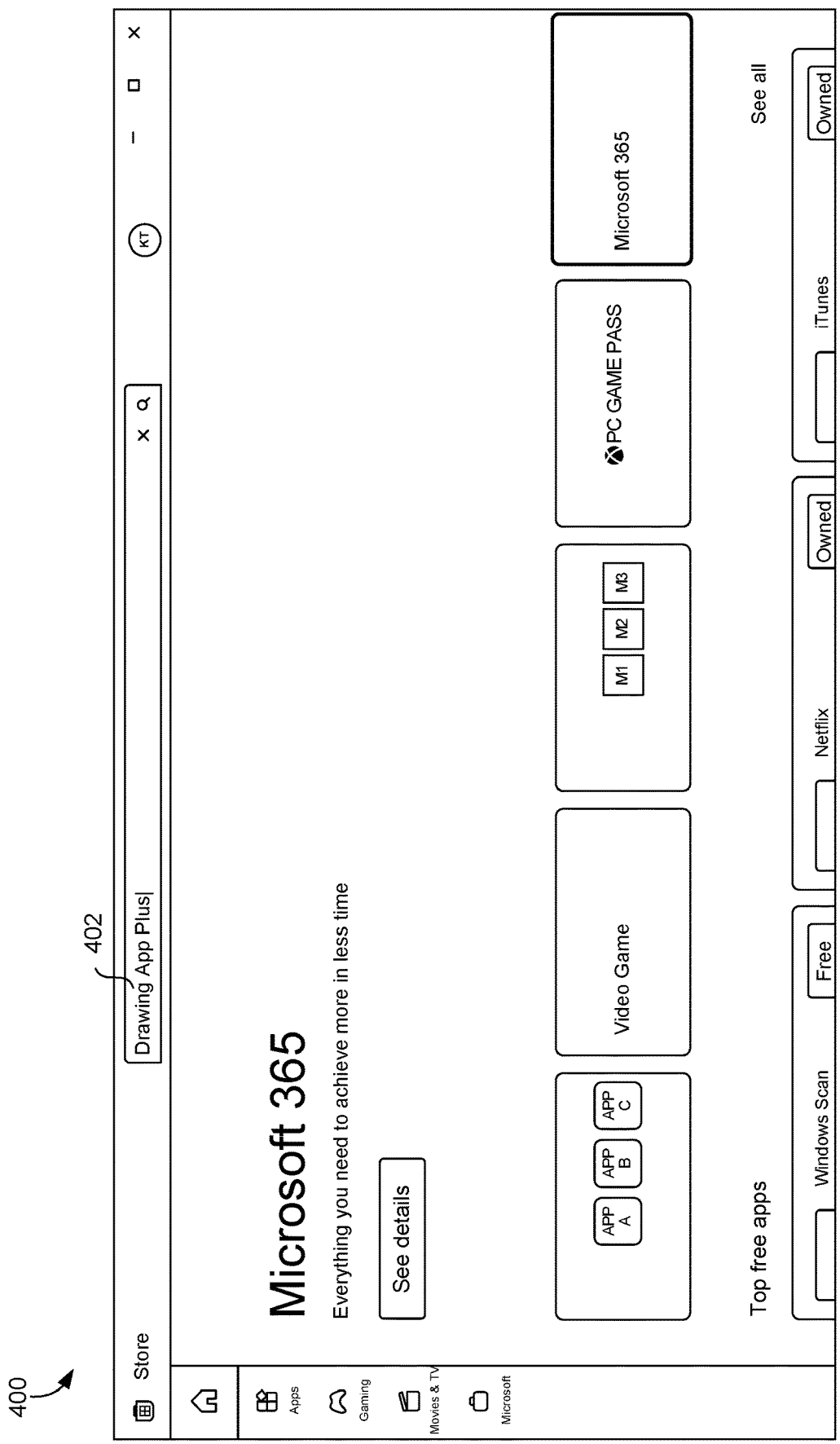
Figure 4B:
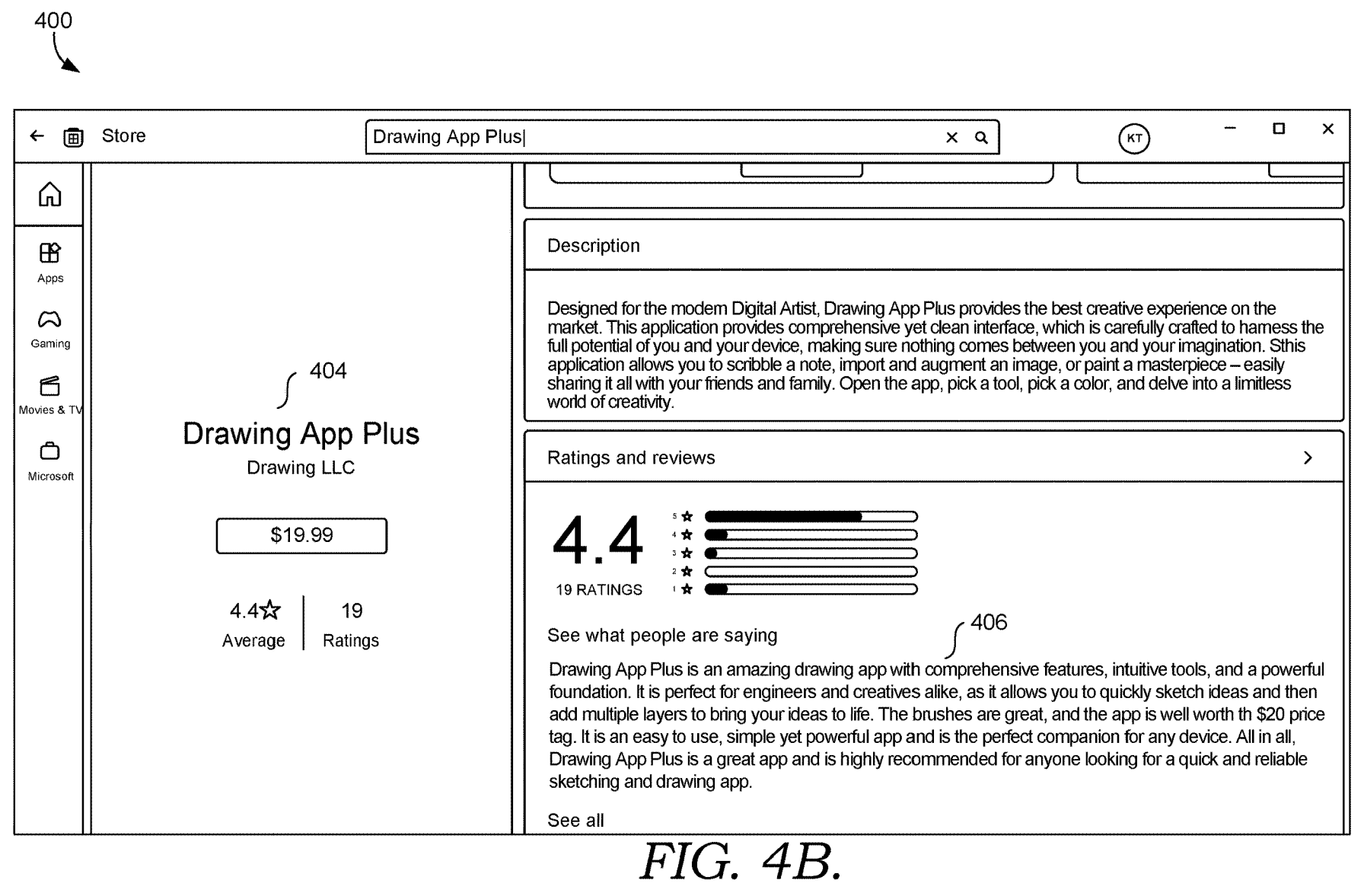

Turning to FIGS. 4A and 4B, FIGS. 4A and 4B provide another example of an online store 400 that enables purchasing of various items, such as various products and services. In this example, assume a user searches for a particular item 402, as shown in FIG. 4A. In such a case, a representation 404 of the item is presented in FIG. 4B. In accordance with presenting a representation 404 of the item, a review summary 406 is presented. As described, the review summary 406 is generated via implementations described herein, and can reflect or represent various aspects of previously provided reviews of the item. Such reviews may also be presented. For instance, a user may scroll down to view the various reviews associated with all of the ratings (here, 19 ratings) or a portion thereof.

Figure 5:
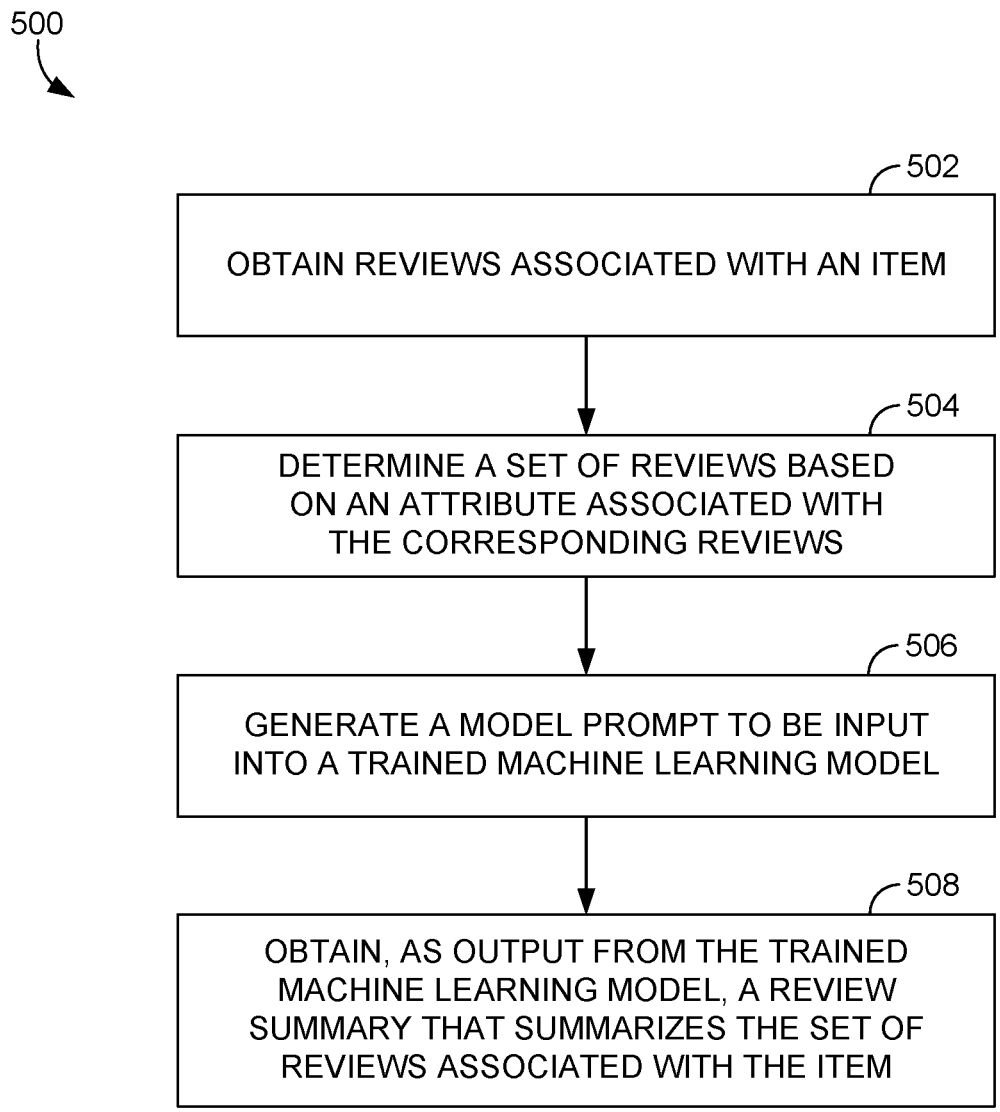
FIG. 5 provides a first example method for facilitating efficient generation of review summaries, in accordance with aspects of the technology described herein.
Figure 6:
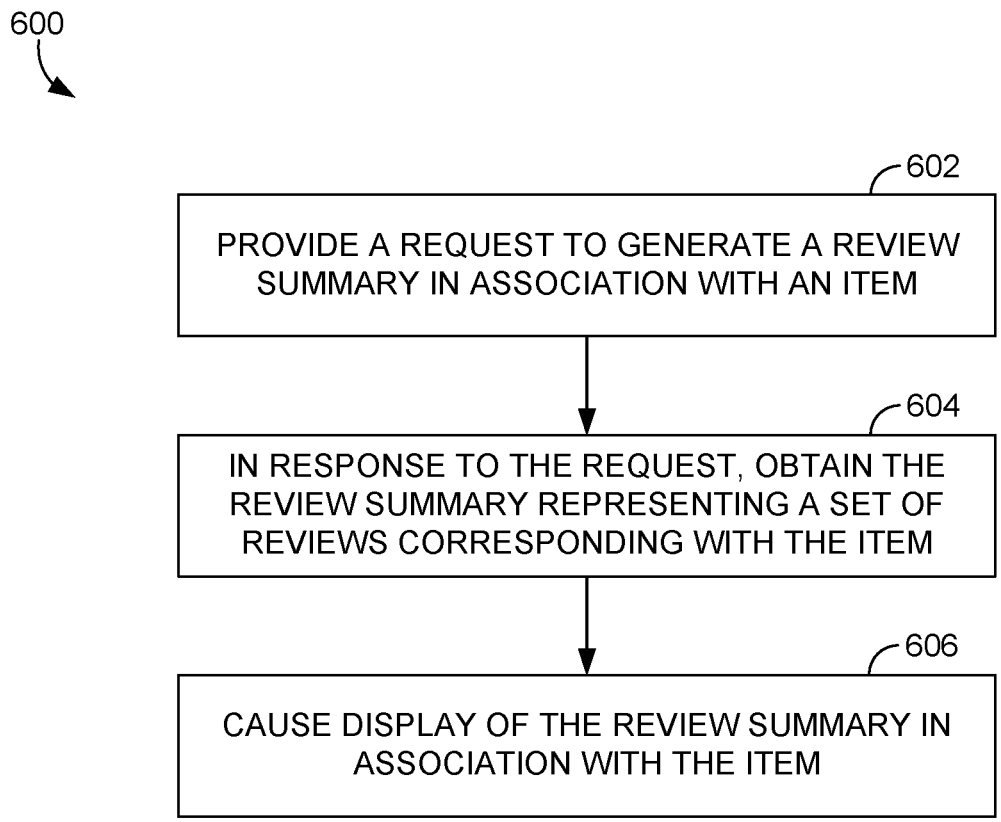
FIG. 6 provides a second example method for facilitating efficient generation of review summaries, in accordance with aspects of the technology described herein.
Figure 7:
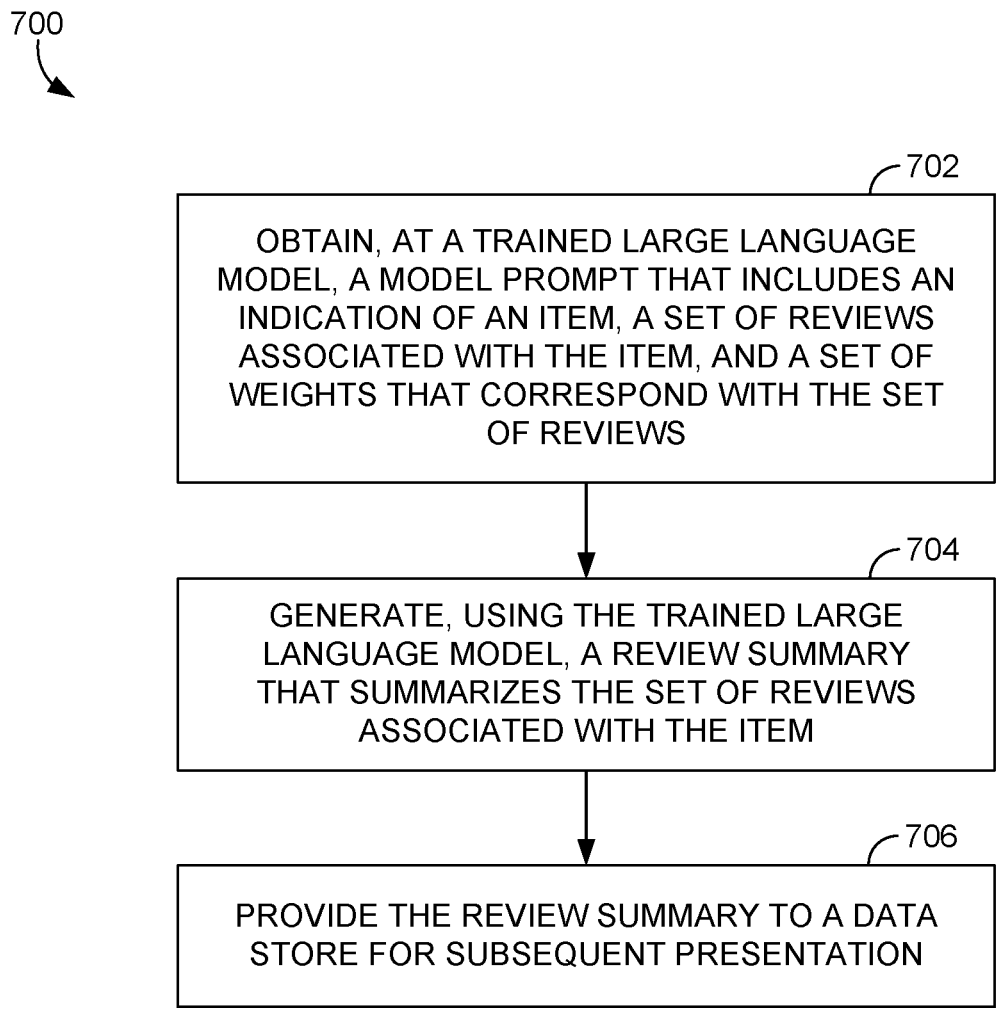
FIG. 7 provides a third example method for facilitating efficient generation of review summaries, in accordance with aspects of the technology described herein.

As described, various implementations can be used in accordance with embodiments described herein. FIGS. 5-7 provide methods of facilitating efficient generation of review summaries. Methods 500, 600, and 700 can be performed by a computer device, such as device 800 described below. The flow diagrams represented in FIGS. 5-7 are intended to be exemplary in nature and not limiting.

Turning initially to method 500 of FIG. 5, method 500 is directed to facilitating efficient generation of review summaries, in accordance with embodiments of the present technology. Initially, at block 502, reviews associated with an item are obtained. In embodiments, the reviews are input or provided by various reviewers based on their prior experience with the item. The particular item for which reviews are obtained can be identified in any of a number of ways. As one example, the particular item may be provided via a user device or a review service indicating the particular item for which to generate a review summary. At block 504, a set of the reviews is determined based on an attribute associated with the corresponding reviews. In this way, a particular portion or set of reviews, from the obtained reviews, is identified for using to generate a review summary. Any type or amount of attributes may be used to determine or select the set of reviews. As one example, the attribute that is used to determine the set of reviews includes weights associated with the reviews. Weights can be assigned or determined in various ways including, for example, review feedback, dates associated with the reviews, and/or the like. Further, in some cases, the set of reviews may be determined or selected in accordance with an input size constraint associated with the trained machine learning model. For example, assume an input size constraint is 3000 tokens. In such a case, the set of reviews are selected to total less than 3000 tokens. At block 506, a model prompt to be input into a trained machine learning model is generated. In embodiments, the model prompt includes an indication of the item and the determined set of the reviews. In some cases, the model prompt may include an output attribute indicating a desired output associated with the review summary. An output attribute may include, for instance, an indication of a target type of output, a length of desired output, a target language for output, or the like. One example of a trained machine learning model that may be employed is a large language network (e.g., GPT-3, GPT-4). At block 508, a review summary that summarizes the set of the reviews associated with the item is obtained, as output from the trained machine learning model. In some cases, the review summary is stored for subsequent use. In this way, upon receiving an indication to provide a review summary for the item, the review summary can be accessed and provided, for example for display at a user device.

Turning now to FIG. 6, method 600 is directed to efficiently generating review summaries, in accordance with embodiments of the present technology. Initially, at block 602, a request to generate a review summary in association with an item is provided. Such a request may be based on a user selection, an expiration of a time period, or the like. In some embodiments, a request to generate a review summary is provided via a review service. In other embodiments, a request to generate a review summary is provided via a user device. At block 604, in response to the request, the review summary representing a set of reviews corresponding with the item is obtained. The set of reviews for which the review summary is generated may be determined by selecting the reviews from a preprocessed plurality of reviews based on a criteria or attribute associated with the reviews (e.g., date of reviews, weight of reviews, or the like). The plurality of reviews may be preprocessed to remove one or more reviews, such as reviews with negative content or language, reviews having less than or greater than a predetermined threshold rating, or the like. In embodiments, the review summary is generated via a trained large language model. For example, a model prompt including the set of reviews corresponding with the item may be generated and, thereafter, the model prompt input into the trained large language model to generate the review summary representing the set of reviews. At block 606, the review summary is caused to be displayed, via a graphical user interface, in association with the item. In some embodiments, the review summary is displayed in response to identification of a user interest of the item. For example, based on a user indicating an interest in the item, the review summary is displayed. In such a case, the review summary can be accessed from storage and provided for display in association with the item of interest.

With reference now to FIG. 7, method 700 is directed to facilitating efficient generation of review summaries, in accordance with embodiments of the present technology. Initially, at block 702, a model prompt that includes an indication of an item, a set of reviews associated with an item, and a set of weights that correspond with the set of reviews is obtained at a trained large language model. In embodiments, the model prompt may include an output attribute to indicate a desired format or style for the review summary. The set of weights may be generated for the reviews in any number of ways. For example, the set of weights may be based on review ratings, review feedback, review dates, or a combination thereof. In some cases, the set of reviews excludes reviews having negative language and reviews associated with a rating below a predetermined threshold. In this way, the reviews may be preprocessed such that particular types of reviews are removed. At block 704, a review summary that summarizes the set of reviews associated with the item is generated, using the trained large language model. In embodiments, the review summary is generated in accordance with the set of weights that correspond with the set of reviews. At block 706, the review summary is provided to a data store for subsequent presentation. In some cases, the review summary is subsequently provided for display based on a request to view the review summary for the item. Such a request may be explicitly provided or implicitly provided.

Accordingly, we have described various aspects of technology directed to systems, methods, and graphical user interfaces for intelligently generating and providing review summaries. It is understood that various features, subcombinations, and modifications of the embodiments described herein are of utility and may be employed in other embodiments without reference to other features or subcombinations. Moreover, the order and sequences of steps shown in the example methods 500, 600, and 700 are not meant to limit the scope of the present disclosure in any way, and in fact, the steps may occur in a variety of different sequences within embodiments hereof. Such variations and combinations thereof are also contemplated to be within the scope of embodiments of this disclosure.

In some embodiments, a computerized system, such as the computerized system described in any of the embodiments above, comprises one or more processors, and one or more computer storage media storing computer-useable instructions that, when executed by the one or more processors, cause the one or more processors to perform operations. The operations comprise obtaining reviews associated with an item. The operations may further comprise determining a set of the reviews based on an attribute associated with the corresponding reviews. The operations may further comprise generating a model prompt to be input into a trained machine learning model. The model prompt includes an indication of the item and the determined set of the reviews. The operations may further comprise obtaining, as output from the trained machine learning model, a review summary that summarizes the set of the reviews associated with the item. In this way, embodiments of this disclosure enable an improved user experience across a number of computer devices, applications and platforms. Also in this way, embodiments, as described herein, enable efficient generation of review summaries via use of trained machine learning models, such as large language model, without requiring fine-tuning of the model. Further, in this way, embodiments, as described herein, cause certain review summaries associated with items to be programmatically surfaced and presented without requiring computer tools and resources for an individual to manually perform operations to produce this outcome.

In any combination of the above embodiments of the computerized system, the obtained reviews are provided based on prior experience with the item.

In any combination of the above embodiments of the computerized system, the attribute that is used to determine the set of the reviews comprises weights associated with the reviews.

In any combination of the above embodiments of the computerized system, the weights associated with the computerized system, the weights associated with the reviews is based on obtained review feedback.

In any combination of the above embodiments of the computerized system, the attribute that is used to determine the set of reviews comprises dates associated with the reviews.

In any combination of the above embodiments of the computerized system, the set of reviews are further determined in accordance with an input size constraint associated with the trained machine learning model.

In any combination of the above embodiments of the computerized system, the trained machine learning model comprises a large language network.

In any combination of the above embodiments of the computerized system, the system can further perform storing the review summary that summarizes the set of the reviews associated with the item; and in response to a request for the review summary, providing the review summary for display.

In any combination of the above embodiments of the computerized system, the generated model prompt includes an output attribute indicating a desired output associated with the review summary.

In any combination of the above embodiments of the computerized system, the output attribute comprises an indication of a target type of output, a length of output, or a target language for output.

In other embodiments, a computer-implemented method is provided. The method includes providing a request to generate a review summary in association with an item. The method may further include in response to the request, obtaining the review summary representing a set of reviews corresponding with the item, the review summary being generated via a trained large language model. The method may further include causing display, via a graphical user interface, of the review summary in association with the item. In this way, embodiments of this disclosure enable an improved user experience across a number of computer devices, applications and platforms. Also in this way, embodiments, as described herein, enable efficient generation of review summaries via use of trained machine learning models, such as large language model, without requiring fine-tuning of the model. Further, in this way, embodiments, as described herein, cause certain review summaries associated with items to be programmatically surfaced and presented without requiring computer tools and resources for an individual to manually perform operations to produce this outcome.

In any combination of the above embodiments of the computer-implemented method, the method may further include preprocessing a plurality of reviews associated with the item to remove one or more reviews; and selecting the set of reviews from the preprocessed plurality of reviews, wherein the set of reviews are selected from the preprocessed plurality of reviews based on at least one criteria associated with the reviews.

In any combination of the above embodiments of the computer-implemented method, the request is automatically provided in a periodic manner.

In any combination of the above embodiments of the computer-implemented method, the review summary is caused to be displayed based on an identified user interest of the item.

In any combination of the above embodiments of the computer-implemented method, the method further includes generating a model prompt that includes the set of reviews corresponding with the item; and inputting the model prompt into the trained large language model to generate the review summary representing the set of reviews.

In other embodiments, one or more computer storage media having computer-executable instructions embodied thereon that, when executed by one or more processors, cause the one or more processors to perform a method is provided. The method includes obtaining, at a trained large language model, a model prompt that includes an indication of an item, a set of reviews associated with an item, and a set of weights that correspond with the set of reviews. The method also includes generating, using the trained large language model, a review summary that summarizes the set of reviews associated with the item, the review summary generated in accordance with the set of weights that correspond with the set of reviews. The method further includes providing the review summary to a data store for subsequent presentation. In this way, embodiments of this disclosure enable an improved user experience across a number of computer devices, applications and platforms. Also in this way, embodiments, as described herein, enable efficient generation of review summaries via use of trained machine learning models, such as large language model, without requiring fine-tuning of the model. Further, in this way, embodiments, as described herein, cause certain review summaries associated with items to be programmatically surfaced and presented without requiring computer tools and resources for an individual to manually perform operations to produce this outcome.

In any combination of the above embodiments of the media, the model prompt further includes an output attribute to indicate a desired format or style for the review summary.

In any combination of the above embodiments of the media, the set of weights are generated based on review ratings, review feedback, review dates, or a combination thereof.

In any combination of the above embodiments of the media, the method further comprises providing the review summary for display based on a request to view the review summary for the item.

In any combination of the above embodiments of the media, the set of reviews exclude reviews having negative language and reviews associated with a rating below a predetermined threshold.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 8:
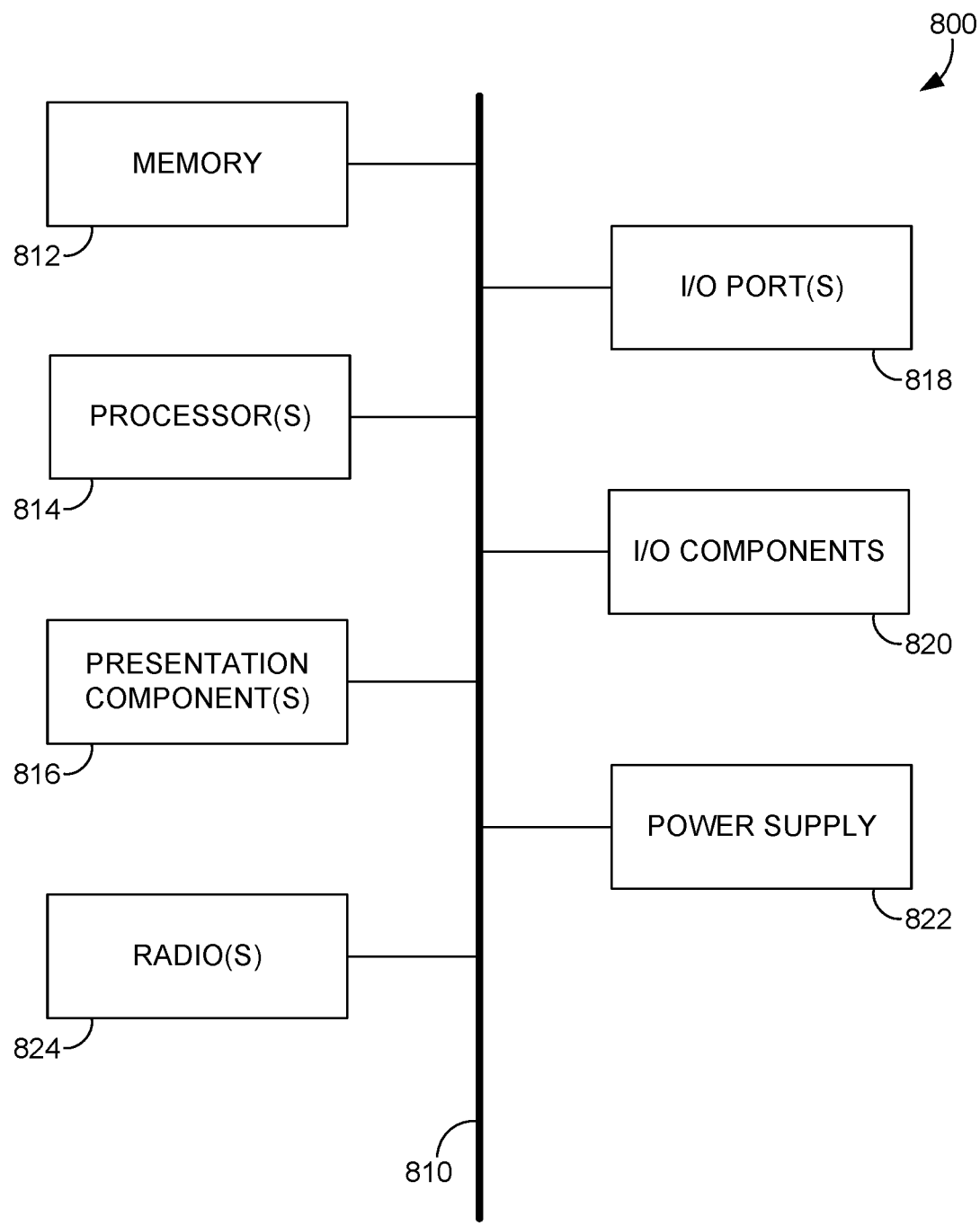
FIG. 8 is a block diagram of an exemplary computing environment suitable for use in implementing aspects of the technology described herein.

Referring to the drawings in general, and to FIG. 8 in particular, an exemplary operating environment for implementing aspects of the technology described herein is shown and designated generally as computing device 800. Computing device 800 is just one example of a suitable computing environment and is not intended to suggest any limitation as to the scope of use or functionality of the technology described herein. Neither should the computing device 800 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 8, computing device 800 includes a bus 810 that directly or indirectly couples the following devices: memory 812, one or more processors 814, one or more presentation components 816, input/output (I/O) ports 818, I/O components 820, an illustrative power supply 822, and a radio(s) 824. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 8 is merely illustrative of an exemplary computing device that can be used in connection with one or more aspects of the technology described herein. Distinction is not made between such categories as "workstation," "server," "laptop," and "handheld device," as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 812 includes computer storage media in the form of volatile and/or nonvolatile memory. The memory 812 may be removable, non-removable, or a combination thereof. Exemplary memory includes solid-state memory, hard drives, and optical-disc drives. Computing device 800 includes one or more processors 814 that read data from various entities such as bus 810, memory 812, or I/O components 820. Presentation component(s) 816 present data indications to a user or other device. Exemplary presentation components 816 include a display device, speaker, printing component, and vibrating component. I/O port(s) 818 allow computing device 800 to be logically coupled to other devices including I/O components 820, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 814 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 800. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

A computing device may include radio(s) 824. The radio 824 transmits and receives radio communications. The computing device may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A computing system comprising:
   a processor; and
   computer storage memory having computer-executable instructions stored thereon which, when executed by the processor, configure the computing system to perform operations comprising:
   obtain a plurality of reviews that each comprise a description associated with an item;
   determine a set of reviews, from the plurality of reviews, to include in a model prompt in accordance with an input prompt size constraint associated with a trained large language model, wherein the set of reviews are determined from the plurality of reviews based on dates associated with the plurality of reviews, applicability to a recent version of the item, or a particular attribute associated with reviewers of the set of reviews, such that the set of reviews when included the model prompt cause the trained large language model to generate an item insight based on content of the set of reviews;
   generate, based on the set of reviews, a data structure including information indicating the item, the description associated with the item, the particular attribute, and weights corresponding to reviews of the set of reviews;
   generate the model prompt to be input into the trained large language model, the model prompt including the data structure and the set of reviews; and
   obtain, as output from the trained large language model, a review summary that summarizes the set of reviews associated with the item and indicates the item insight.

2. The computing system of claim 1, wherein the plurality of reviews are authored based on prior experience with the item.

3. The computing system of claim 1, wherein the particular attribute further comprises weights associated with the plurality of reviews.

4. The computing system of claim 3, wherein the weights are based on obtained review feedback.

5. The computing system of claim 1 wherein the particular attribute further comprises a context associated with reviews of the plurality of reviews.

6. The computing system of claim 1, further comprising:
   storing the review summary that summarizes the set of reviews associated with the item; and
   in response to a request for the review summary, providing at least a portion of the review summary for display.

7. The computing system of claim 1, wherein the model prompt includes an output attribute indicating a desired output associated with the review summary.

8. The computing system of claim 7, wherein the output attribute comprises a target type, a length, or a target language.

9. A computer-implemented method comprising:
   obtaining a plurality of reviews associated with an item;
   filtering, based on an intent of a review summary, a set of reviews of the plurality of reviews, where the set of reviews are selected based on a context associated with the intent;
   generating a data structure including an indication of the item and the context based on the set of reviews
   generating a prompt to be inputted into a trained large language model, the prompt including the data structure and the set of reviews, such that the set of reviews when included in the prompt causes the trained large language model to generate an item insight based on content of the set of reviews; and
   obtaining, as output from the trained large language model, the review summary, including the intent, that summarizes the set of reviews and indicates an item insight.

10. The method of claim 9, wherein the context includes an item context associated with the item.

11. The method of claim 10, wherein the item context includes at least one of: a release date of the item, a version of the item, a publisher of the item, and metadata associated with the item.

12. The method of claim 9, wherein the context includes a review context associated with a first review of the set of reviews.

13. The method of claim 12, wherein the review context includes at least one of: a reviewer identifier, a date associated with the first review, a tone associated with the first review, demographics information associated with the first review, indication of purchases associated with the first review, and a feedback associated with the first review.

14. The method of claim 9, wherein the method further comprises assigning a weight to a first review of the set of reviews and including the weight to the prompt.

15. The method of claim 14, wherein the weight is generated by the trained large language model based on the first review.

16. The method of claim 9, wherein the intent further comprises at least one of: a positive item insight, a constructive item insight, and a negative item insight.

17. One or more computer storage media having computer-executable instructions embodied thereon that, when executed by one or more processors, cause the one or more processors to perform operations comprising:

selecting, from a plurality of reviews including a description associated with an item, a review to include in a model prompt in accordance with an input size constraint associated with a trained model, wherein the review is selected based on at least one of a review context, an item context, user data, reviewer data, and a review weight;

generating a data structure based on the plurality of reviews, the data structure including an indication of the item, the description associated with the item, an attribute associated with the review, and the review weight;

generating a prompt to be input into the trained model, the prompt including the data structure and the review, such that the review when included in the prompt cause the trained model to generate an item insight based on content of the review; and obtaining, as output from the trained model, a review summary and the item insight.

18. The media of claim 17, wherein the operations further comprises causing the review summary to be displayed based on an identified user's interest of the item.

19. The media of claim 17, wherein the review weight further comprises a set of weights for the review based on review ratings, reviewer metadata, review dates, and review feedback.

20. The media of claim 17, wherein the trained model is a large language model.

\* \* \* \* \*